Patented July 29, 1941

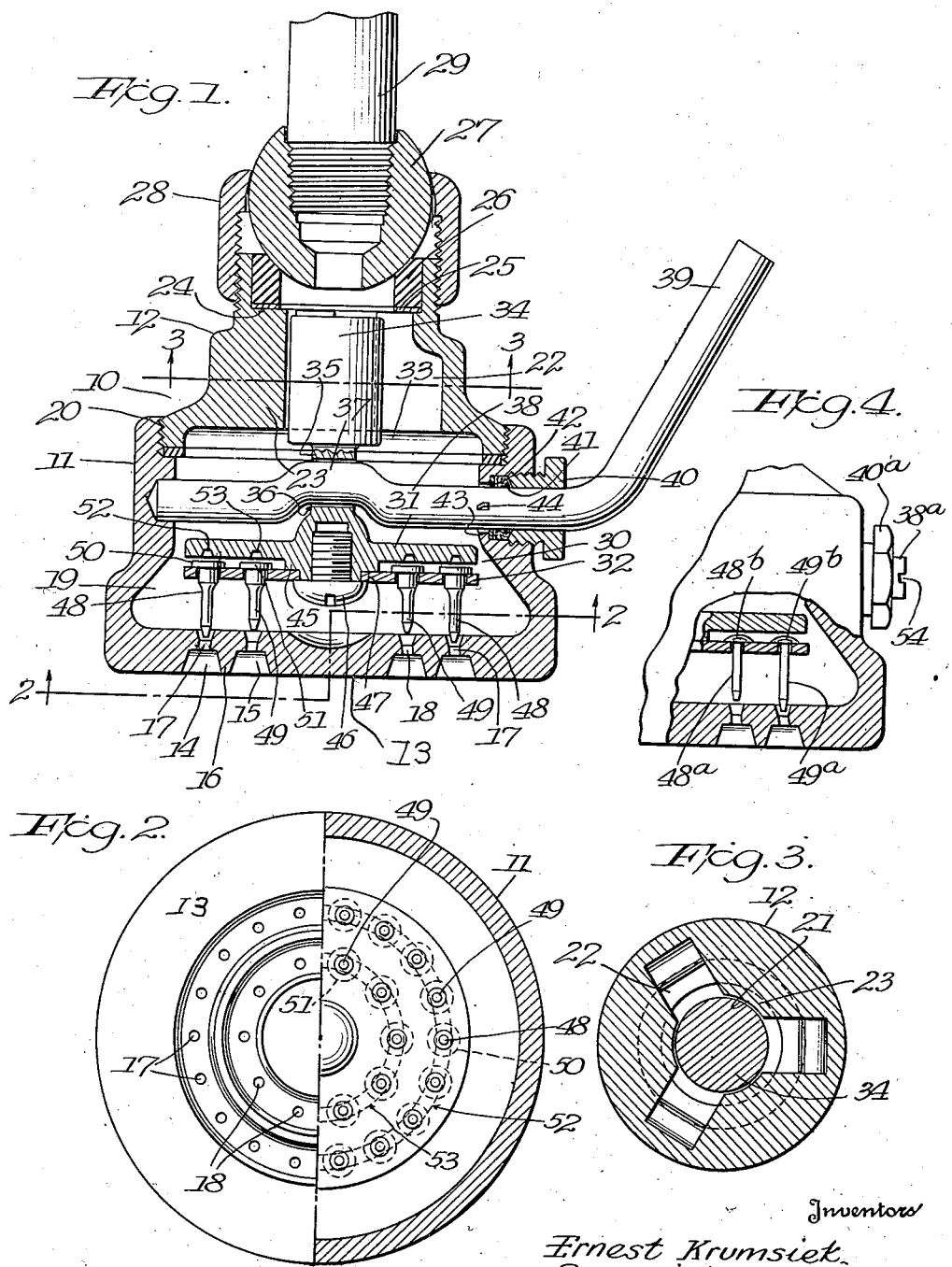

2,251,192

UNITED STATES PATENT OFFICE 2,251,192

SHOWER HEAD

Ernest Krumsiek, Ray Kileen, and Emmett M. Reedy, Decatur, Ill., assignors to Mueller Co., Decatur, Ill., a corporation of Illinois Application September 8, 1938, Serial No. 229,036

4 Claims. (Cl. 299—136)

This invention relates to shower heads of the regulable and self-cleaning type disclosed in United States Patent 1,982,538 issued November 27, 1934 to E. M. Reedy. A purpose of the invention is to provide a shower head which, while retaining the advantages of the said patented head, is of such simplified construction that manufacturing costs are enabled to be substantially reduced.

As exemplifying the new construction, I have shown a preferred embodiment in the accompanying drawing, in which Figure 1 is an axial section of the head.

Figure 2 is a view partly in plan and partly in section, the view being taken substantially on the line 2—2 of Figure 1.

Figure 3 is a section substantially on line 3—3 of Figure 1, and

Figure 4 is a fragmentary view of a modified construction, the view being partly in elevation and partly on the same section line as Figure 1.

Referring to the drawing, and first to Figures 1 to 3, the head is generally designated by the reference numeral 10, and as here shown comprises forward and rear portions 11 and 12, respectively. Portion 11 may vary as to form, but is here shown as being generally cylindrical, although slightly outwardly flared immediately behind the face plate 13 which in the present showing is flat and normal to the axis of the cylinder. Forwardly plate 13 is provided with a pair of concentric grooves 14 and 15 separated by an annular rib 16. Within the grooves the plate is provided with equally spaced perforations 17 and 18 which debouch into the head cavity 19 through flared portions as shown in Figure 1.

Head portion 12 is removably coupled with portion 11, preferably by a threaded and packed coupling as shown at 20, Figure 1. Internally this portion is provided with an axial bore 21 and with longitudinally extending downwardly enlarged grooves 22 which merge with the bore so that longitudinally extending ribs 23 are provided. The ribs are surmounted by a shoulder 24 which supports a washer 25 on which rests a packing 26 cooperating with a ball joint member 27, the latter being secured to the head portion by means of a coupling nipple 28. A water supply pipe 29 is threaded into member 27.

Within the head is a reciprocable member having an expanded portion 30 constituted by two circular disc portions 31 and 32 which overlie the face plate in substantially parallel relation thereto. The reciprocable member also comprises a shank generally designated at 33 which is perpendicular to the expanded portions and coaxial with them and with the head. The shank comprises an upper cylindrical portion 34 which is rectilinearly guided by the ribs 23 as most clearly shown in Figure 3. Between portions 30 and 34 the shank is provided with a web portion 35 which is provided with a transversely extending slot 36 in which is operatively received the crank portion 37 of a rod 38.

Rod 38 is journaled in opposite side walls of portion 11 and has an externally projecting crank arm 39. That portion of the rod adjacent the crank arm is journaled in a gland nut 40 threaded in the body portion 11 and compressing a packing 41 against a washer 42 which surrounds rod 38 and bears against a shoulder 43 which surrounds rod 38 with sufficient spacing to provide clearance for an abutment 44 which may be formed by swaging, for example, on rod 38 immediately inwardly of washer 42. The abutment 44 cooperates with washer 42 to prevent outward displacement of the crank rod. By rotating or rocking the rod 38, the reciprocable member is movable between limit positions.

As here shown, disc 31 of expanded portion 30 of the reciprocable member is formed integral with the shank portion. Disc 32 is held against a shoulder 45 below disc 31 by means of a screw 46. Preferably the two discs are positively held against relative rotation by some suitable means, such as a key indicated at 47, Figure 1.

Disc 32 is provided with perforations which register with the perforations 17 and 18 of the face plate. In the disc perforations are disposed the enlarged shank portions of pins 48 and 49 which project toward the face plate in substantial alignment with the respective face plate perforations. The enlarged portions of the pins are surmounted by heads as at 50 and 51 which lie between discs 31 and 32 and are of less thickness than the space existing between the discs. The pins are loosely received in the disc perforations and consequently, in view of the head clearance, have a slight range of universal tilting. Directly over the pin series, disc 31 is provided with annular grooves 52 and 53.

The reciprocating member is shown in Figure 3 in maximum retracted position, and it will be noted that while pins 49 are entirely free of their associated perforations 18, pins 48 project somewhat within their associated perforations 17. One or more of the long pins 48 are provided off the center of the reciprocable member so as to prevent any substantial amount of rotation of the latter relative to the head, thus assuring proper register of the pins with their associated face plate perforations. As here contemplated, two diametrically opposite pins 48 are provided, the rest of the pins in the outer series being the same as pins 49.

With the pointed ends of the pins 49 in the position shown in Figure 1, maximum flow through the face plate perforations is permitted. Upon turning rod 38 the reciprocable member is moved toward the face plate and the pins 49 enter their associated perforations, this being assured by the pointed ends of the pins and the flared inner portion of the perforations. Due to the tiltability of the pins they center themselves in the perforations when subjected to the flow of water and uniform jets are provided, the jets being regulable in accordance with the relation of the pins to the face plate perforations. When the crank portion 37 of rod 38 is in the opposite relation from that shown in Figure 1, pins 48 and 49 are preferably projected entirely through the face plate perforations into grooves 14 and 15, the groove walls serving as guards. In projecting the pins through the face plate perforations any foreign matter in the latter is removed. Grooves 52 and 53 prevent the collection of any foreign matter on the heads of the pins.

In the assembly of the rod 38 and gland nut 40, the latter is placed on the rod either before the crank portion 37 is formed or before the crank arm 39 is formed. In the assembly of the head, after the reciprocable member has been positioned in head portion 11, rod 38, previously assembled with the gland nut, is projected through the opening bounded by the shoulder 43 and through slot 36 of shank portion 35 into the opposite bearing and the gland nut is tightened. The two body portions may be coupled either before or after rod 38 has been assembled with portion 11 and the reciprocating member.

Economy of construction can be further enhanced by forming the pins with straight shanks as shown at 48a and 49a, Figure 4, with upset convexed heads 48b and 49b. With this construction the grooves 52 and 53, Figure 1, may be omitted, since the convex heads are self-cleaning. Also, according to Figure 4, the rod 38a extends only slightly out beyond the gland nut 40a and is provided with a slot 54 engageable by a screw drive. This arrangement is desirable for hotel installations and the like, where it may be desired to set the head for a constant character of spray. In order to clear the face plate perforations, a screw driver may be applied to the slot 54 from time to time and the pins reciprocated into and out of the face plate perforations. In either construction the packing gland suffices to hold the crank rod in adjusted position.

It will be understood that the disclosure herein is illustrative and not restrictive of the invention, and that changes may be made in the form and arrangement of parts without departing from the invention as defined in the following claims.

We claim:

1. A shower head comprising a body having separably coupled portions of which one is hollow and has a perforated face plate and the other is provided with means for connection with a supply line, a member comprising an expanded portion within said one of said portions in overlying relation to said face plate and a shank portion projecting from said expanded portion in the opposite direction from said face plate, pins projecting from said expanded portion toward said face plate and respectively aligned with said perforations, means in said other portion engaging said shank portion externally for guiding the same rectilinearly, the guided portion of said shank portion being cylindrical and at least one of said pins which is off the axis of said shank portion being of sufficient length to be engaged in its associated perforation throughout the reciprocating range of said member whereby to prevent rotation of said member about the axis of said shank portion, there being a supply passage in said other portion past said guide means to the interior of said one of said portions, and means carried by said one of said portions for reciprocating said member whereby to alter the relation of said pins to said perforations.

2. A shower head comprising a body having a face plate provided with perforations and a cavity behind said face plate, a member comprising an expanded portion within said cavity overlying said face plate and a shank portion projecting from said expanded portion in the opposite direction from said face plate, said expanded portion comprising a pair of flat parallel discs of which the one adjacent the face plate is provided with perforations registering with the perforations of the face plate, pins loosely disposed in the perforations of said one of said discs and having convexed heads between the two discs, the disc remote from the face plate cooperating with the heads of the pins to maintain the pins in place while permitting slight universal tilting of the pins relative to said one of said discs, means in said body cooperating with said shank portion for guiding the same rectilinearly, the guided portion of said shank portion being cylindrical and at least one of said pins which is off the axis of said shank portion being of sufficient length to be engaged in its associated perforation throughout the reciprocating range of said member whereby to prevent rotation of said member about the axis of said shank portion, there being an inlet passage extending past said guide means to said cavity, and means for reciprocating said member whereby to alter the relation of said pins to said perforations.

3. A shower head comprising a body having separably coupled portions of which one is hollow and has an internally flat face plate provided with perforations, a member comprising a disc portion within said one of said portions in overlying relation to said face plate and a shank portion projecting from said disc portion in the opposite direction from said face plate, said disc portion having perforations respectively aligned with the face plate perforations, pins having shank portions extending loosely through the perforations of said disc portion toward the face plate and heads resting against the surface of said disc portion which is remote from said face plate, said surface being flat, said member including a second disc portion having a flat surface overlying said heads in spaced relation thereto so that tilting of the pins is permitted while escape of the pins from the first disc portion is prevented, said member including centrally disposed spacing means between said disc portions and a screw engaged in said member and having a head centrally engaging the first disc portion to secure the same in operative position against the spacing means, means in said other body portion engaging said shank portion externally for guiding the same rectilinearly, there beng ia supply passage in said other portion past said guide means to the interior of said one of said body portions, and means carried by the last-mentioned body portion operable to reciprocate said member whereby to alter the relation of said pins to the face plate perforations.

4. A shower head comprising a hollow body and a reciprocable spray regulating member in said body, said member including a shank portion extending in the direction of reciprocation and provided with a transverse slot, and a rod journalled in bearings in opposite walls of said body and bent to provide an offset crank portion operatively disposed in said slot and having an external handle portion at one end, said slot being formed with fixed parallel walls spaced apart longitudinally of the shank portion a distance slightly greater than the diameter of said rod, one of said bearings being provided by a gland nut adjacent said handle portion, the other end of said rod being insertable through said slot and into the other bearing to position said crank portion operatively in said slot.

ERNEST KRUMSIEK.
RAY KILEEN.
EMMETT M. REEDY.